Figure 1:
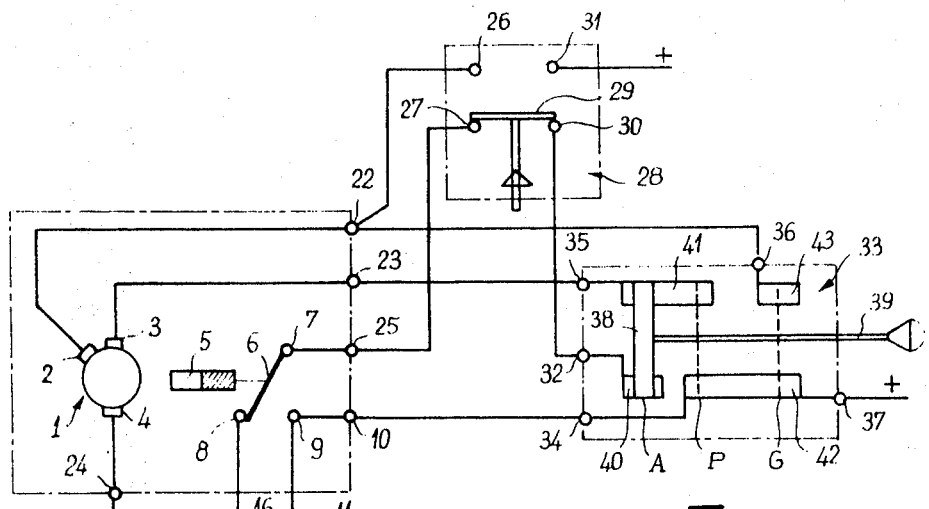

United States Patent

[11] 3,609,496

| [72] | Inventors | Francois Peroy;<br>Jean Pineau, both of Billancourt, France |
|---|---|---|
| [21] | Appl. No. | 758,380 |
| [22] | Filed | Sept. 9, 1968 |
| [45] | Patented | Sept. 28, 1971 |
| [73] | Assignees | Regie Nationale Des Usines Renault<br>Billancourt, France;<br>Automobiles Peugeot<br>Paris, France |
| [32] | Priority | Sept. 18, 1967 |
| [33] | | France |
| [31] | | 121,375 |

[54] WINDSCREEN WIPER CONTROL SYSTEMS
3 Claims, 2 Drawing Figs.

[52] U.S. Cl. .................................................. 318/444,
    318/466
[51] Int. Cl. .................................................. H02p 1/04
[50] Field of Search .......................................... 318/361,
    443, 444, 466, 261

[56] References Cited
UNITED STATES PATENTS

| 2,878,436 | 3/1959 | Mundt ........................ | 318/443 |
| 3,184,666 | 6/1965 | Groetzner ................... | 318/261 |

FOREIGN PATENTS

| 1,093,430 | 11/1954 | France ........................ | 318/361 |
| 1,285,849 | 1/1962 | France ........................ | 318/443 |

*Primary Examiner*—Benjamin Dobeck
*Assistant Examiner*—Thomas Langer
*Attorney*—Stevens, Davis, Miller & Mosher ABSTRACT: The improvement is characterized by the combination of the windscreen wiper driving motor with a reversing switch responsive to the windscreen washer pump control means, with a timelag device and with a reversing switch responsive to a fixed-stop control cam, whereby a single maneuver of a single member is sufficient for causing the motor to operate as consistent with the momentary atmospheric circumstances, an additional maneuver of said pump control means permitting modifying said motor operation, if necessary.

PATENTED SEP 28 1971 3,609,496

WINDSCREEN WIPER CONTROL SYSTEMS

The present invention relates to windscreen wiper control systems, notably for automotive vehicles.

Various windscreen wiper control systems are known which comprise means adapted to stop the wiper blades in a fixed position, and single- or two-speed motors, wherein the motor energizing circuit is opened generally at the end of a blade stroke or excursion, the motor rotor being stopped by electromagnetic brake means controlled by short-circuiting the armature winding through the medium of a timing member.

In known systems of this type the windscreen wiper operation is scarcely adapted to the various driving conditions arising as a consequence of different atmospheric circumstances or of the surface condition of the windscreen to be wiped. Among these atmospheric circumstances, the following four cases are encountered most frequently:

1. Wet road surface following a severe rainfall,
2. Drizzle,
3. Rain or snow,
4. Sudden shower or heavy rainfall.

It is the object of the present invention to provide an improvement in windscreen wiper control systems with a view to adapt the operation of the windscreen wiper to various driving conditions arising as a consequence of different atmospheric circumstances and also of the windscreen condition.

This improvement in windscreen wiper control systems of the "fixed stop position" type, wherein the windscreen wiper motor is stopped at the end of the stroke of the wiper blades driven thereby, having means comprising a single- or two-speed motor associated with a two- or three-way switch, a reversing switch responsive to a fixed-stop cam driven from said motor, a timelag or delayed-action device with a built-in rate adjustment member and a corresponding switch, and a windscreen washer pump having control means adapted to actuate a bipolar reversing switch, is characterized in that the motor switch is associated on the one hand with the bipolar reversing switch actuated by the windscreen washer pump and on the other hand with said timing member and with said first-named reversing switch responsive to said fixed stop cam, this combination of means permitting through an adequate circuit arrangement of the different components, and by actuating each time only one of these components, obtaining an operation of the windscreen wiper motor adapted to the different atmospheric circumstances occurring during the operation of the vehicle, or of stopping this motor, a complementary actuation of the windscreen pump control member permitting modifying at will this operation, if necessary.

Figure 2:
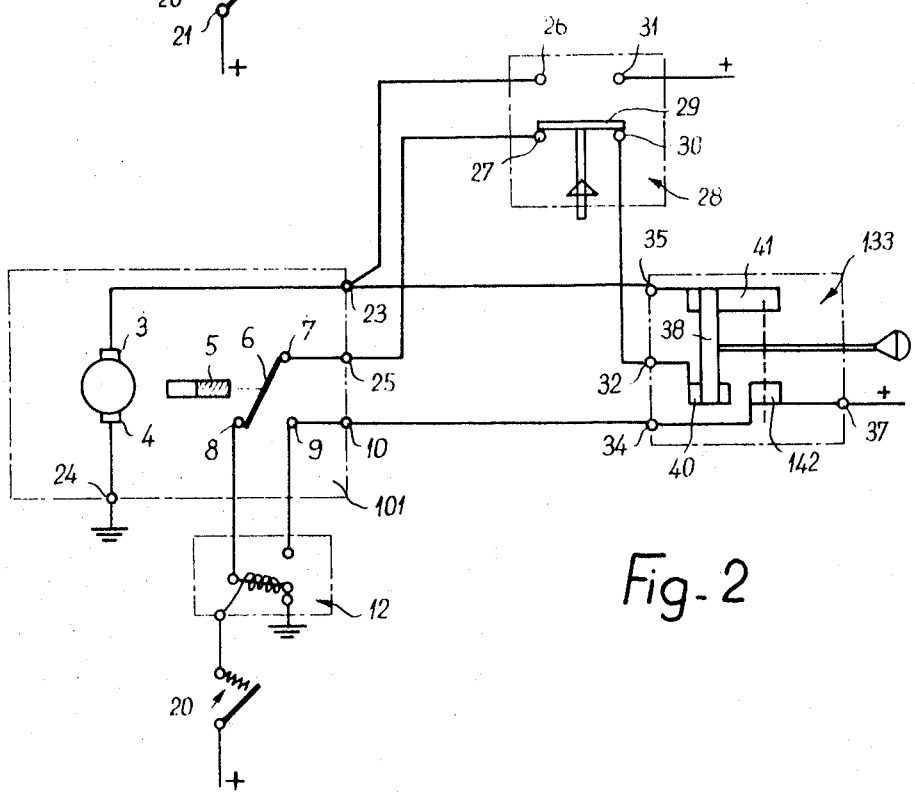

In order to afford a clearer understanding of this invention reference will now be made to the attached drawing illustrating diagrammatically by way of illustration two typical forms of embodiments thereof. In the drawing:

FIG. 1 is a wiring diagram showing a first form of embodiment of the windscreen wiper control system incorporating a two-speed motor, and FIG. 2 is a similar diagram showing a similar system but using a single-speed motor.

Referring first to the diagram of FIG. 1 it will be seen that the control system illustrated comprises a windscreen wiper motor 1 having three armature brushes 2, 3 and 4, brush 2 corresponding to the high-speed operation and brush 3 to low speed operation. To simplify the drawing the inductor of this motor has been omitted. The motor 1 is adapted to drive a stop control cam 5 of known type, which actuates a reversing switch of which the movable contact arm 6 is adapted to connect a contact 7 to either of a pair of fixed contacts 8 and 9. Contact 9 is connected to a terminal 10 on the one hand and to a fixed contact 11 of a timelag device 12 on the other hand; the other fixed contact 8 is connected to a terminal 13 of the same device 12.

This timelag device 12 acting as reversing switch consists for example of a bimetal strip 14 interconnecting said terminal 13 and a movable contact 15, and comprises a heating element 16 having one end connected to said movable contact 15 and the opposite end connected to a terminal 17. The timelag or timing device may also consist of any other time-base device, whether of electrical, electronic thermal or other type; in this example, another fixed contact 18 of timelag device 12 is grounded. Terminal 17 is connected in turn to one terminal 19 of a conventional rheostat and switch device 20 controlling the motor speed, of which the other terminal 21 is connected to the positive terminal of the current source of which the negative terminal is grounded.

The brushes 2, 3 and 4 of motor 1 are connected to terminals 22, 23 and 24, respectively, terminal 24 being grounded. The reversing switch contact 7 is connected to another terminal 25.

The terminals 22 and 25 are connected to the fixed contacts 26 and 27 of a bipolar reversing switch 28 having its movable contact arm 29 responsive to the screen-washer pump control (not shown in the FIG.). In its inoperative position this movable contact arm 29 connects the fixed contact 27 to another fixed contact 30; when the pump is actuated the same movable contact arm 29 connects the other fixed contact 26 to a contact 31 leading to the positive terminal of the current source.

Besides, the contact 30 of reversing switch 28 is connected to a terminal 32 of a switch 33 controlling the windscreen wiper motor 1. Terminals 34, 35 and 36 of this switch are connected to motor terminals 10, 23 and 22 of motor 1, respectively; on the other hand, a terminal 37 is connected to the positive terminal + of the current source. The movable contact arm 38 of this switch is adapted to be actuated by means of a hand lever 39 and to be moved to either of three positions, i.e. an inoperative or stop position A, a normal or low-speed position P and a normal or high-speed position G. In position A this arm connects a contact stud 40 (already connected to terminal 32) to a registering contact stud 41 (already connected to terminal 35); in position P, this stud 41 is connected to another stud 42 connected in turn to terminal 37, and in position G this stud 42 is connected to a further contact stud 43 connected in turn to terminal 36.

This device operates as follows:

In the first case of the atmospheric circumstances mentioned in the preamble of this specification, i.e. when the vehicle is driven on a wet road after a severe rainfall, the windscreen which is normally clean and dry may become dirty by the mud projected by oncoming and overtaking vehicles. In this case the driver simply depresses the knob controlling the operation of the windscreen washer, whereby suitable nozzles will cause water to be sprayed onto the windscreen surface, and at the same time the contacts 26 and 31 to be interconnected via the contact arm 29 of reversing switch 28, thus starting the windscreen wiper motor 1 at high-speed through the circuit 31, 26, 22, 2, 4 and 24. When the control pressure thus exerted on the pump control member is released the water spray is stopped and the motor resumes at low speed its fixed-stop position, as the cam 5 causes the arm 6 of the reversing switch to tilt towards contact 9. Thus, a circuit 37, 42, 34, 10, 9, 6, 7, 25, 27, 29, 30, 32, 40, 38, 41, 35, 23, 3, 4 and 24 is established At the end of the windscreen wiper blade stroke said cam 5 restores the contact arm 6 to its position of engagement with the contact 8, and the motor 1 is braked by the electromagnetic device as a consequence of the resulting circuit 18, 15, 13, 8, 6, 7, 25, 27, 29, 30, 32, 40, 38, 41, 35, 23, 3, 4 and 24 which causes the motor armature to be short circuited by the ground of the apparatus.

In the second case of said atmospheric circumstances (i.e. drizzle) the moderate quantity of water falling upon the windscreen does not require a permanent operation of the wiper blades; under these conditions, the driver would be led to actuate the switch 33 intermittently, obviously a maneuver becoming rapidly rather tiresome. To avoid this inconvenience, a timelag member 12 is provided, the operation of which has already been described in the French Pat. No. 1,347,908 of Nov. 23, 1962 this device being adapted to restart the windscreen wiper motor at regular time intervals which can be predetermined at will, the blades being stopped in their retracted or sideways position after each period of operation. British Pat. 1,050,338 is an English language equivalent of the above-mentioned French Pat.

In the device according to this invention the adjustment of the rheostat 20 in a position selected by the driver as a function of the desired wiper blade speed controls the heating of element 16 associated with the bimetal arm 14 of reversing switch 12, the circuit being in this case through 21, 19, 17, 16, 15 and 18. At the end of the preselected time period the contact arm 14 tilts towards contact 11, thus opening the circuit 18-21, and the motor 1 is energized for low-speed operation, the contact arm 38 of switch 33 remaining in position A, through the circuit 37, 42, 34, 10, 9, 11, 15, 14, 13, 8, 7, 25, 27, 29, 30, 32, 40, 38, 41, 35, 23, 3, 4 and 24. When the fixed stop cam 5 causes the contact arm 6 of the reversing switch to tilt from contact 8 to contact 9, the circuit is formed through 37, 42, 34, 10, 9, 6, 7, 25, 27, 29, 30, 32, 40, 38, 41, 35, 23, 3, 4 and 24. During this period, the timelag or time-base member 12 is deenergized and the bimetal strip 14 has cooled down and moved back to position 18, so that the motor 1 performs a complete revolution corresponding to a to-and-fro movement of the wiper blades. In the retracted position at the end of this stroke the fixed stop cam 6 drives the contact arm 6 of the reversing switch from contact 9 to contact 8, and the armature of motor 1 is braked by short circuit through elements 24, 4, 3, 23, 35, 41, 38, 40, 32, 30, 29, 27, 25, 7, 8, 13, 14, 15 and 18, and the ground. The time-base device 12 will then resume its initial conditions and the cycle is ready to start again.

In this specific case of atmospheric circumstances, the driver of the vehicle of which the windscreen has become dirty with mud projected by oncoming or overtaking vehicles can switch the windscreen motor to high-speed operation in order rapidly to clean the windscreen surface, by simply actuating the windscreen washer pump, thus reverting to the first case contemplated hereinabove. The return to intermittent operation takes place automatically when the windscreen washer pump control member is released.

In the third case of atmospheric circumstances, i.e. in case of rainfall or snowfall, the permanent low-speed operation of the system is obtained by setting the motor control switch 33 to position P, thus establishing a circuit 37, 42, 38, 41, 35, 23, 3, 4 and 24. In this mode of operation the actuation of the windscreen washer pump causes the energizing circuit of motor 1 to be switched from low-speed to high-speed operation via brush 2, the resumption of low-speed operation taking place automatically when the windscreen washer pump control 28 is released.

In the fourth case of atmospheric circumstances, e.g. heavy rainfall, the high-speed operation of motor 1 is obtained by setting the control member of switch 33 to position G, the motor energizing circuit being in this case through elements 37, 42, 38, 43, 36, 22, 2, 4 and 24.

In all the cases discussed hereinabove the inoperative condition of the system, with the wiper blades in their retracted or sideways position, is obtained by simply moving the previously operated control member to its "stop" position; this control member may thus be that of switch 33, or of the rheostat-switch device 20, or of the reversing switch 28 associated with the windscreen washer pump control device, without having to actuate another control member.

The device according to the present invention is also applicable without difficulty to a single-speed windscreen motor 101, for example of the low-speed type, as illustrated in FIG. 2. In this case the high-speed brush 2 and terminal 22 can be dispensed with in the motor 101. The switch 133 has only two positions; i.e. position A (as in FIG. 1), and position P in which the contact arm 38 connects the contact stud 41 to a reduced stud 142 connected to terminal 37. In this case too, stud 43 and terminal 36 of FIG. 1 are eliminated, and the motor terminal 23 is connected to contact 27 of reversing switch 28 of the washer pump control system. The operation of this device is similar to that of the device shown in FIG. 1, except that no high-speed operation is contemplated.

We claim:

1. An improvement in a windscreen wiper control system of the so-called "fixed-stop position" type, wherein a windscreen wiper motor is stopped automatically at the end of the stroke of wiper blades driven from said motor, the control system comprising a motor, a control switch operatively connected to control energization of said motor, a fixed-stop cam driven by said motor, a reversing switch responsive to said fixed-stop cam, a timelag drive to control intermittent operation of the wiper motor, a member for adjusting the wiper blade rate and switch means incorporated into said timelag device, a two-pole reversing switch, and a windscreen washer pump having control means adapted to actuate said two-pole reversing switch, said motor control switch being connected on the one hand with the two-pole reversing switch responsive to the control means of said washer pump, and on the other hand with said timelag device and said reversing switch responsive to a fixed-stop cam whereby a single operation of only one of these reversing switches effects a windscreen wiper motor operation consistent with different atmospheric circumstances which motor operation is modified by a selective complementary actuation of said pump control member.

2. An improvement in a windscreen wiper control system according to claim 1, wherein said two-pole reversing switch responsive to the washer pump control means is connected on the one hand to a current source and to a brush of the motor armature, and on the other hand to the motor control switch and to the reversing switch responsive to said fixed-stop cam driven from said motor, so that an actuation of the screen washer pump control means alone, while the other switch members of the system are in their inoperative position, permits the starting of the motor.

3. An improvement according to claim 1, wherein said member for adjusting the wiper blade rate is connected directly to an energizing terminal of a source of current.